July 21, 1964
S. P. HELD
3,142,062
SIGNAL RECEIVING AND PROCESSING UNIT
FOR AERIAL NAVIGATION SYSTEM
Filed June 30, 1961
2 Sheets-Sheet 2
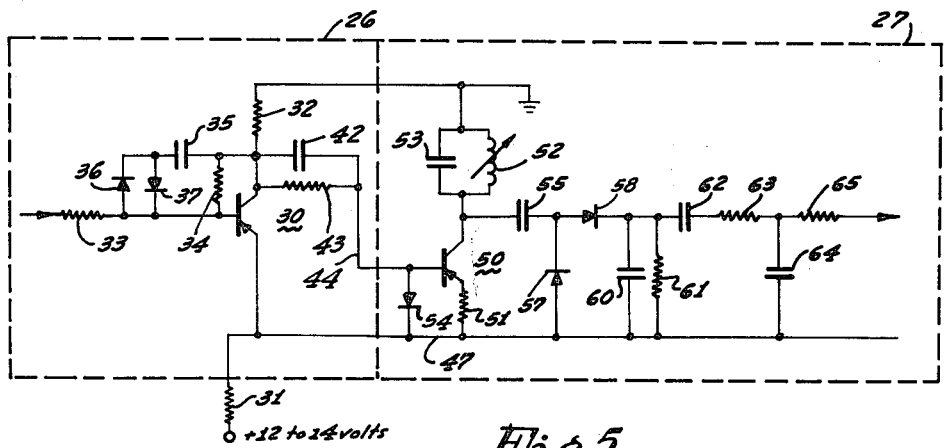
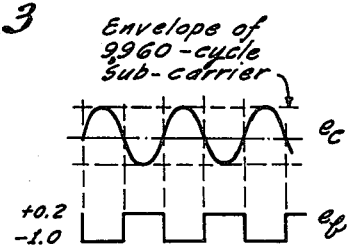
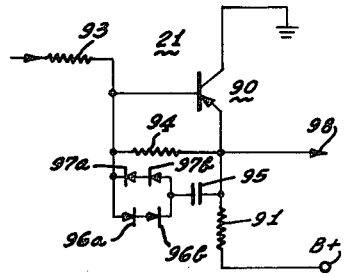
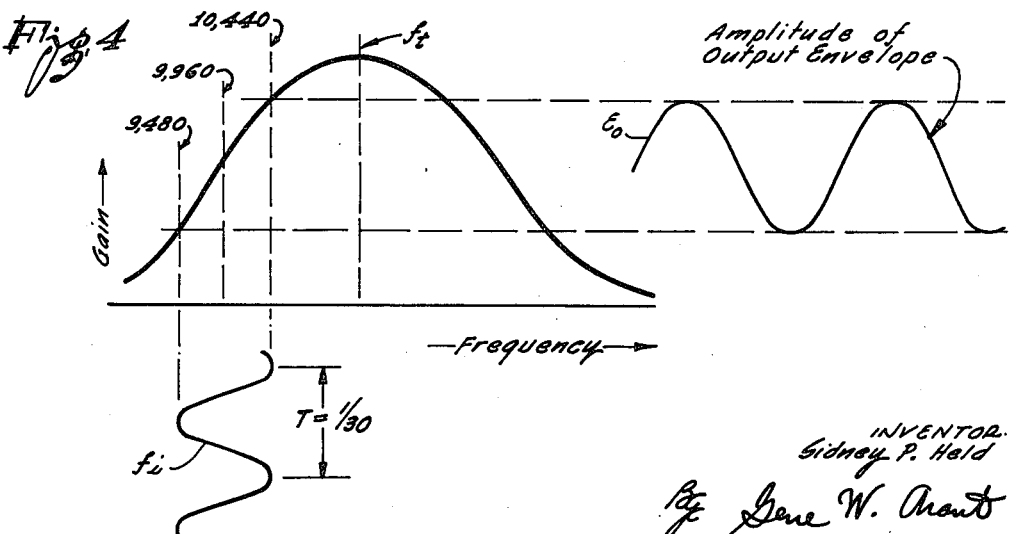
INVENTOR.
Sidney P. Held
By Gene W. Arnold
Attorney United States Patent Office 3,142,062
Patented July 21, 1964

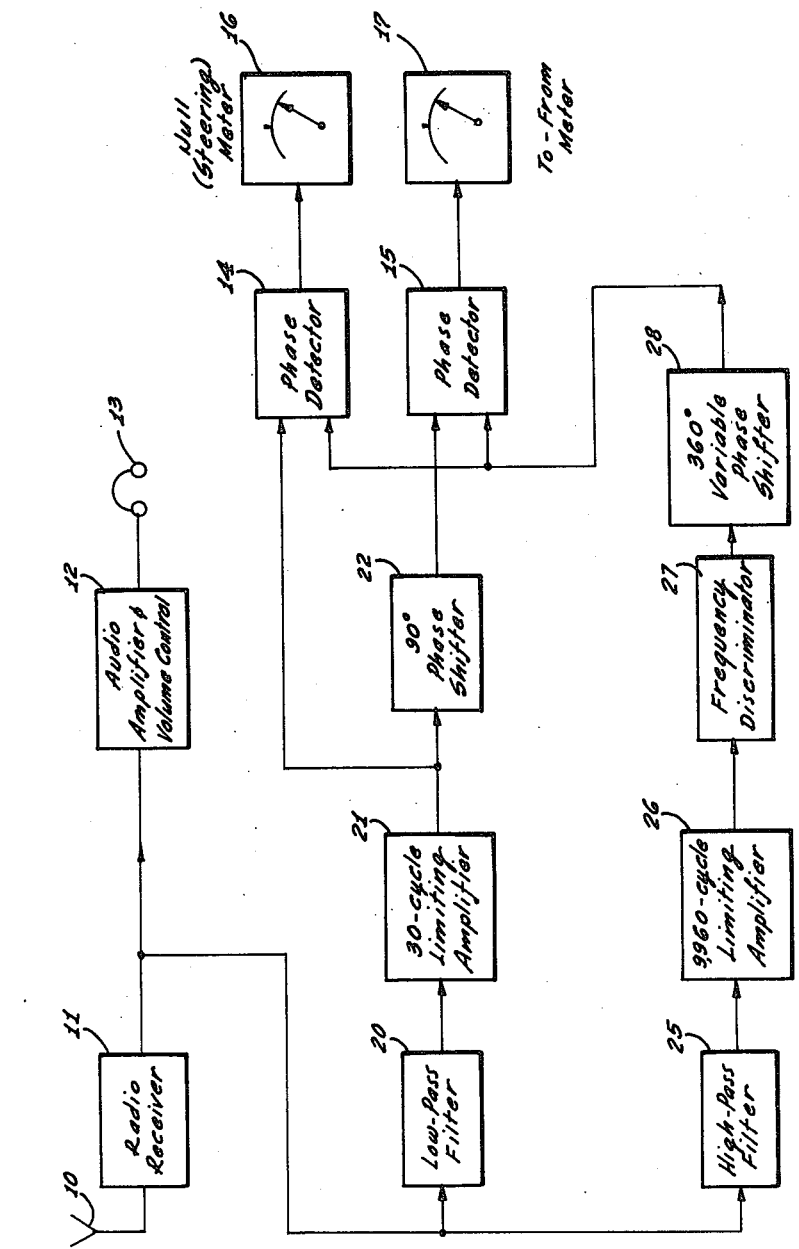

3,142,062
SIGNAL RECEIVING AND PROCESSING UNIT FOR AERIAL NAVIGATION SYSTEM
Sidney P. Held, Manhattan Beach, Calif., assignor to Nova-Tech, Inc., a corporation of California
Filed June 30, 1961, Ser. No. 121,164
3 Claims. (Cl. 343—106)

The present invention relates to a signal receiving and processing unit for an aerial navigation system of the omnidirectional type, commonly known as Omni.

By means of the Omni navigation system an aircraft determines its course with reference to the location of a particular radio transmitter, located at an air field from which the aircraft has taken off or which lies somewhere along its route. The transmitters at the various air fields in any geographical area operate on different carrier frequencies, but each conveys as its basic intelligence information a pair of 30-cycle signals whose phase relationship when received by the aircraft indicates the angular position of the aircraft relative to the particular transmitter.

In the conventional Omni system one of the 30-cycle signals is established as a reference signal and is frequency-modulated upon a sub-carrier having a nominal frequency of 9,960-cycles, the frequency-modulated sub-carrier in turn being amplitude-modulated upon the carrier. The Omni transmitter has a number of directional antennas, each pointing radially outwardly from the transmitter location in a particular direction, and each having a sufficiently broad beam to cover its own area as well as to overlap somewhat into the areas of the adjacent antennas. These antennas are fed by a rotating system, the maximum amplitude of the transmitted power being fed to the various antennae sequentially in a repetitious cycle, with the result that a receiver picking up the transmitted signal at a distance finds the carrier to be amplitude-modulated at the rate of rotation of the transmitter supply system. This rate of rotation is established at 30 complete revolutions per second and is synchronized with the 30-cycle reference signal.

In the aircraft the two amplitude-modulated signals, one being the 30-cycle variable phase signal resulting from rotation of the transmitter energy supply system and the other being the 9,960-cycle sub-carrier, are detected in a standard VHF receiver which is concurrently used to receive voice communications from the same Omni transmitter. These two AM signals are then sent to an auxiliary processing unit where the 30-cycle reference signal carried by the 9,960-cycle sub-carrier is detected by frequency discrimination, and the relative phase of the two 30-cycle signals is measured in order to determine the angular position of the aircraft relative to the transmitter locaion.

In the Omni receiving unit a manually operable variable phase shifter is used for shifting the phase of one of the signals prior to making the comparison. The dial of this variable shifter is set for whatever course of flight is desired. Presently standard types of phase detectors provide the most reliable and accurate indication when the two input signals are exactly 90° out of phase, and the indicating meter associated with the phase detector then produces a zero or null reading. In the Omni, therefore, the phase shift is so selected that the indicator meter associated with the phase detector has a zero or null reading when the aircraft is on course.

The reading of the "null" or "steering" meter is ambiguous because of the inability of its associated phase detector to measure the direction or sense of the 90° difference. A second phase comparison is therefore made, and one of the signals is shifted 90° between the first and second comparisons. The second comparison indicates whether the aircraft is on course, or off by 180°, i.e., whether flying "to" or "from" its objective.

One of the disadvantages of conventional Omni equipment is that when the aircraft departs from its prescribed course the aircraft personnel are not provided with any precise indication of the extent of such departure. That is, the deviation from zero position of the needle on the "null" meter is not proportional to the angular deviation of the aircraft from its prescribed course.

One of the objects of the invention, therefore, is to provide a processing unit for the reception of Omni navigation signals, in which the deviation of the "null" meter needle from its zero position is substantially proportional to the angular deviation of the aircraft from its prescribed course.

Another object of the invention is to provide an Omni signal processing unit which may be utilized in conjunction with a VHF receiver whose signal output amplitude varies between wide limits.

A further object of the invention is to provide an Omni signal processing unit which is accurate and reliable in its operation but cheaply and easily constructed.

Still another object of the invention is to provide a novel signal detection and comparison circuit, for detecting a signal that is frequency-modulated upon a carrier and for comparing the detected signal with another signal of identical frequency but differing phase.

Yet a further object of the invention is to provide a novel frequency detection circuit utilizing a tuned amplifier.

An additional and essentially unrelated object of the invention is to provide a novel limiting amplifier capable of producing a square wave output signal in response to a sinusoidal input signal.

The objects and advantages of the invention will be more readily apparent from the following description considered in conjunction with the accompanying drawings, in which:

FIGURE 1 is a schematic block diagram of the invention;

FIGURE 2 is a schematic wiring diagram of the frequency discriminator of FIGURE 1 and its associated limiting amplifier;

FIGURES 3 and 4 illustrate the wave form, amplitude, and frequency relationships involved in the frequency discriminator; and FIGURE 5 is a schematic wiring diagram of an alternate form of limiting amplifier.

Reference is now made to FIGURE 1 of the drawings which illustrate the general arrangement of the signal receiving and processing unit of the present invention. An antenna 10 carried by the aircraft is coupled to a conventional VHF radio receiver 11 from which an audio output signal is fed to an audio amplifier and volume control 12. A headset 13 or other sound transducer is driven from the audio amplifier 12.

The audio output signals from the radio receiver 11 are also fed to a low-pass filter 20 and a high-pass filter 25. These filters together with the associated limiting amplifiers, frequency discriminator, phase shifters, phase detectors, and indicating meters, constitute the Omni signal receiving and processing unit, which is separate from but auxiliary to the radio receiver 11 and is preferably housed in a separate chassis. Low-pass filter 20 accepts the 30-cycle signal that was amplitude-modulated upon the VHF carrier, while high-pass filter 25 accepts the 9,960-cycle signal that was amplitude-modulated upon the carrier.

Voice communications are received from the Omni transmitter concurrently with the navigation signals. The 30-cycle and 9,960-cycle signals being at respective ends of the voice communication frequency band may be discriminated against by appropriate tuning of the audio amplifier 12, so as to avoid annoyance to aircraft personnel listening to the ear phones 13 or other sound transducer.

Within the Omni processing unit, the output of low-pass filter 20 is fed to a limiting amplifier 21 which is preferably tuned for maximum gain at 30 cycles. The output of high-pass filter 25 is fed to a limiting amplifier 26 that is designed to amplify the 9,960-cycle sub-carrier. In the Omni transmitter the sub-carrier is modulated by varying its frequency either up or down by 480 cycles, this being accomplished at the 30-cycle rate as previously described. Therefore, the response of limiting amplifier 26 is substantially flat over the frequency band from 9,480 cycles to 10,440.

One of the features of the present invention is that the Omni signal processing unit is capable of operating over a wide range of output signal amplitude of radio receiver 11. The sensitivities and the amplification factors of the amplifiers 21 and 26 are so adjusted relative to the predetermined magnitude of their respective square wave output signals that each of these amplifiers reaches its maximum output level in response to a relatively weak output signal from radio receiver 11, which may be at or even below the threshold of hearing as measured at the ear phones 13.

In the Omni processing unit the output of limiting amplifier 26 is fed to a frequency discriminator 27 for the purpose of recovering the 30-cycle reference signal therefrom. The reference signal is then fed from the output of the frequency discriminator to a variable phase shifter 28. As is conventional, phase shifter 28 is variable throughout the range of 360°, by manual adjustment of a knob or equivalent device, and the setting of the phase shifter is indicated on a dial that is calibrated from zero to 360°, inclusive.

A first phase detector 14 has its output coupled to the "null" or "steering" meter 16. A second phase detector 15 has its output coupled to the "to-from" meter 17. The variable phase 30-cycle signal is supplied from limiting amplifier 21 direct to phase detector 14, and also direct to a 90° phase shifter 22. The output of phase shifter 22 is fed to phase detector 15. The output of variable phase shifter 28 is fed directly to both of the phase detectors 14 and 15.

The circuit construction of the filters 20 and 25, the phase shifters 22 and 28, and the phase detectors 14 and 15, is well known in the prior art, and so far as the present invention is concerned any standard circuit construction may be utilized in these portions of the system.

It is characteristic of presently known variable phase shifters that the attenuation of the signal in passing therethrough varies somewhat as a function of the phase shift angle. Nevertheless, in accordance with the present invention, by utilizing the limiting amplifiers 21 and 26 whose output signals are square waves of predetermined amplitude, the amplitudes of the input signals applied to phase detector 14 are substantially constant. At the most, the relative amplitudes of these input signals vary by only 20%. Therefore, whenever the indication of the "null" meter is other than zero, the magnitude of such indication is substantially proportional to the angular value of the deviation of the aircraft from its prescribed course.

Reference is now made to FIGURE 2 of the drawings wherein the electrical circuit of frequency discriminator 27, and of the last stage of limiting amplifier 26, are illustrated in schematic form. Attention will first be directed to the limiting amplifier circuit.

In limiting amplifier 26, a PNP transistor 30 has its emitter connected through a dropping resistor 31 to the positive terminal of a source of direct current energy while its collector is connected through a load resistor 32 to the negative terminal of the power supply, schematically represented as ground. The driving input signal for transistor 30 is applied through a resistor 33 to the transistor base. A bias resistor 34 is interconnected between the base and collector. A capacitor 42 and a resistor 43 are coupled in parallel with each other between the transistor collector and a lead 44, which represents the output of the limiting amplifier stage.

Limiting amplifier 26 also includes a feedback connection from the transistor collector to the transistor base. A capacitor 35 has one of its terminals connected to the collector of transistor 30, its other terminal being connected to the cathode of a semiconductor diode 36 as well as to the anode of a semiconductor diode 37. Diode 36 has its anode connected to the transistor base, to which the cathode of diode 37 is likewise connected. It will be seen that the diodes 36 and 37 are arranged in parallel with each other but with opposite sense, and are also in series with the capacitor 35. In the particular circuit as illustrated the diodes 36 and 37 are silicon diodes. They are characterized by a very low forward current until the applied forward bias reaches a magnitude of approximately 0.6 volt. Therefore, whenever the terminal of capacitor 35 that is connected to these diodes tends to rise more than 0.6 volt above, or to fall more than 0.6 volt below, the potential of the transistor base, a corresponding one of the diodes conducts heavily in the forward direction and thus precludes any further substantial increase in the potential difference between the mentioned circuit points.

The output signal of the limiting amplifier stage appears initially upon the transistor collector, and capacitor 35 is chosen to have sufficient capacitance value so as to pass substantially the entire strength of the output signal through the feedback connection. So long as the collector swing is limited to approximately 1.2 volt the feedback signal through capacitor 35 is of little effect, because of the diode characteristic as previously described. But when the collector swing tends to exceed 1.2 volt the feedback signal is passed by the appropriate diode on each half of the cycle and becomes almost 100% effective.

As will be seen from the circuit arrangement the feedback signal is of negative sense or polarity relative to the input signal. As a result, the output signal of the limiting amplifier is sharply chopped in both its upper and lower excursions. With an input signal of normal strength the output signal of the limiting amplifier is a near-perfect square wave, as shown in the lower portion of FIGURE 3.

While FIGURE 2 illustrates only a single stage of the limiting amplifier 26, in the presently preferred form of the Omni processing unit of FIGURE 1 the limiting amplifier 26 actually includes an emitter-follower first amplifier stage followed by two limiting stages of the type illustrated in FIGURE 2.

Reference is now made to FIGURE 5 illustrating another form of limiting amplifier circuit which, together with appropriate preceding and following amplifier stages, forms the limiting amplifier 21 of FIGURE 1. In the circuit of FIGURE 5 a PNP transistor 90 has its emitter connected through a load resistor 91 to the positive power supply terminal, the transistor collector being grounded. The input signal is fed through a series resistor 93 to the transistor base. A resistor 94 connected between base and emitter controls the bias potential of the base. This amplifier stage is an emitter-follower whose output signal is taken from the emitter as indicated at 98. A feedback connection is made from the emitter to the base of the transistor, and includes a capacitor 95 having one of its terminals connected to the emitter. The other terminal of capacitor 95 is connected to the anode of a semiconductor 97b as well as to the cathode of a semiconductor diode 96b. The cathode of semiconductor diode 97b is connected to the anode of a similar diode 97a, whose cathode is in turn connected to the transistor base. The anode of diode 96b is connected to the cathode of a similar diode 96a, whose anode is connected to the transistor base.

It is not necessary to explain in detail the operation of the circuit of FIGURE 5 since its operating principle is identical to that of the limiting amplifier of FIGURE 2. It will be seen that in each circuit the feedback connection is made from the output electrode of the transistor to its base, serving as the input electrode. Also, in each circuit the feedback connection includes a capacitor connected to the output electrode, and a parallel pair of circuit branches connected in series between the capacitor and the input electrode, each of the parallel circuit branches including at least one semiconductor diode, the diodes of the two circuit branches being arranged with opposing polarities.

Referring again to FIGURE 2, the frequency discriminator 27 will now be described in detail. A PNP transistor 50 has its emitter connected in series with a bias resistor 51. A semiconductor diode 54 has its anode connected to the base of transistor 50, and also to signal output line 44 of limiting amplifier 26. The cathode of diode 54 and the other end of resistor 51 are connected to the same positive voltage supply line 47 as is the emitter of transistor 30. An inductance coil 52 is connected in series between the collector of transistor 50 and ground. A capacitor 53 is connected in parallel with inductance coil 52 so as to provide a parallel-resonant load for transistor 50. The inductance value of the coil 52 may be adjusted for tuning purposes.

Transistor 50 with its bias resistor 51 and tuned parallel-resonant load provides a tuned amplifier circuit whose operation is considerably affected by the fact that it receives a square wave driving signal from the preceding stage, and also by the clamping action of diode 54. Reference is made to FIGURE 3 wherein the input and output wave forms of the tuned amplifier circuit are illustrated. As previously pointed out, the output signal from limiting amplifier 26 is a substantially perfect square wave having a voltage swing or excursion of approximately 1.2 volt. The bias level of the base of transistor 50 is controlled by resistor 43 in conjunction with diode 54. The purpose of diode 54 is to clamp the base of transistor 50 in such a manner that the input square wave is certain to be able to turn on the transistor during half of each cycle. With the clamp, the base of transistor 50 cannot rise more than about 0.2 volt above the potential of the positive supply line 47. A negative driving signal of at least 1.0 volt is therefore available for turning on the transistor.

The particular connection of resistor 43 is significant in that the circuit provides automatic temperature compensation to a large extent. That is, changes in the conductivity of transistor 30 resulting from temperature changes produce a corresponding change in the bias level of the base of transistor 50, in such a direction as to compensate for a change in gain of transistor 50 that would otherwise have been induced by the temperature change.

As shown in FIGURE 3 the lower waveform $e_b$ represents the base potential while the upper waveform $e_c$ represents the collector potential. Initial transients at the time of turning on the circuit are ignored for purpose of the present description which is concerned only with the circuit operation after a condition of stability has been reached. The tank circuit consisting of inductance coil 52 and capacitor 53 maintains a sinusoidal waveform on the collector, the collector voltage being exactly out of phase with the square wave input signal applied to the base.

The frequency discriminating action of the tuned amplifier circuit will now be described in conjunction with FIGURE 4. The square wave output signal from limiting amplifier 26 has a nominal frequency of 9,960 cycles but its frequency in fact varies between a maximum value of 10,440 cycles and a minimum value of 9,480 cycles, as previously described. The tuned amplifier is tuned with a moderately flat response characteristic such that its maximum gain is achieved at a frequency $f_t$ which is somewhat greater than 10,440 cycles. Furthermore, the response characteristic is such that the frequency band of the input signal falls on a portion of the characteristic curve where the gain of the amplifier varies in approximately linear fashion as a function of the applied input frequency. In FIGURE 4 the varying input frequency is indicated by a sinusoidal wave $f_i$ plotted along a vertical axis. It will be seen that $f_i$ is in fact the 30-cycle reference signal which, in the Omni transmitter, was frequnecy-modulated on the 9,960-cycle sub-carrier. In FIGURE 3 only a few cycles of the input and output waves are illustrated, and the collector signal $e_c$ is therefore of constant amplitude throughout these several cycles. In FIGURE 3 parallel dotted lines 70 and 71 represent the maximum upper and lower excursions of the collector signal and therefore define the envelope of the output signal. FIGURE 4, however, takes into account several cycles of modulation which represent several hundred cycles of the 9,960-cycle sub-carrier. The wave form $E_o$ at the right-hand side of FIGURE 4 represents the amplitude of the output envelope, whose amplitude varies as shown in FIGURE 4 as the rate of 30 cycles per second.

In the circuit of FIGURE 2 a capacitor 55 couples the collector of transistor 50 to a half-wave rectifier which includes semiconductor diodes 57 and 58. Diode 57 has its anode connected to the common positive power supply line 47 while its anode is connected to the output side of capacitor 55. Diode 58 has its anode connected to the output side of capacitor 55, and its cathode connected to a conventional rectifier load circuit which includes the parallel combination of a capacitor 60 and a resistor 61. The rectified signal passes from the cathode of diode 58 through a low-pass filter which includes a series capacitor 62 feeding into series resistors 63 and 65, and which also includes a shunt capacitor 64 intermediate to the last-named resistors.

It will be recognized that the half-wave rectifier circuit and the low-pass filter circuit are constructed in conventional fashion. The filter circuit is designed to pass the 30-cycle signal with little attenuation while discriminating against higher frequencies. Non-linearity in the response of the tuned amplifier does not pose any difficulties because the output circuits need recover only a single signal whose frequency is fixed and known.

Actual circuit values that have been satisfactorily used in the circuit of FIGURE 2 are as follows:

| | |
|---|---|
| Transistor 30 | 2N414. |
| Transistor 50 | 2N1743. |
| Potential of supply line 47 | 10.0 volts. |
| Resistor 33 | 4.7K ohms. |
| Resistor 34 | 680K ohms. |
| Resistor 32 | 6.8K ohms. |
| Resistor 43 | 150K ohms. |
| Resistor 51 | 1K ohm, or as selected. |
| Resistor 61 | 220K ohms. |
| Resistor 63 | 47K ohms. |
| Resistor 65 | 47K ohms. |
| Diodes 36 and 37 | Silicon. |
| Diode 54 | Germanium. |
| Diodes 57 and 58 | Germanium. |
| Capacitor 35 | 0.1 μf. |
| Capacitor 42 | 0.01 μf. |
| Capacitor 53 | 0.015 μf. |
| Inductance coil 52 | 20 mh. |
| Capacitor 55 | 0.005 μf. |
| Capacitor 60 | 0.022 μf. |
| Capacitor 62 | 0.22 μf. |
| Capacitor 64 | 0.047 μf. |

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A signal receiving and processing unit for an omnidirectional aerial navigation system of the type in which a carrier transmitted from a transmitter at a fixed location on the ground has a variable phase signal and a sub-carrier amplitude-modulated thereon, said variable phase signal being of fixed frequency, said sub-carrier having a nominally fixed frequency much greater than that of said variable phase signal but having a reference signal frequency-modulated thereon, said reference signal being of identically the same fixed frequency as said variable phase signal and varying in phase relative thereto as a function of the position of the receiver relative to the transmitter location, said signal receiving and processing unit comprising, in combination: detector means for detecting said variable phase signal and said sub-carrier from said carrier; frequency divider means, coupled to said detector means, having a first output for producing said variable phase signal and a second output for producing said sub-carrier; a first limiting amplifier coupled to said first output of said frequency divider means and amplifying said variable phase signal so as to produce a first square wave signal of predetermined magnitude; a second limiting amplifier coupled to said second output of said frequency divider means and amplifying said sub-carrier so as to produce a second square wave signal of predetermined magnitude; a frequency detection circuit coupled to the output of said second limiting amplifier and responsive to said second square wave for reproducing said reference signal in sinusoidal form at a substantially fixed amplitude level; a phase detector having a first input coupled to the output of said first limiting amplifier and a second input coupled to the output of said frequency detection means; and an indicating meter coupled to the output of said phase detector, the circuit operation being such that the deflection of said indicating meter is a function of the phase difference between said first square wave signal and said reproduced reference signal at the point of application to said phase detector.

2. A signal receiving and processing unit as claimed in claim 1 in which said frequency detection circuit comprises a tuned amplifier having an output, and an input coupled to the output of said second limiting amplifier, said tuned amplifier being tuned for maximum gain outside the frequency band of said sub-carrier and having an approximately linear change in gain throughout said frequency band; an amplitude-modulation detector having its input coupled to the output of said tuned amplifier; and a low-pass filter coupled between the output of said detector and said second input of said phase detector, said filter being operable to pass the fixed frequency of said reference signal with little attenuation while discriminating against higher frequencies.

3. A signal receiving and processing unit as claimed in claim 2 in which said tuned amplifier includes a transistor having a base, an emitter and a collector; a source of energizing potential; and a parallel-resonant circuit coupled between said energizing source and the collector-emitter current path of said transistor so as to form a series loop circuit; said base providing the input of said tuned amplifier, said tuned amplifier further including a semi-conductor diode coupled between said base and said energizing source for controlling the bias potential of said base whereby said transistor conducts current during half of each cycle of the square wave input signal, said tuned amplifier output being at the point of interconnection of said parallel-resonant circuit to the collector-emitter current path of said transistor.

References Cited in the file of this patent

UNITED STATES PATENTS

| | | |
|---|---|---|
| 2,885,575 | Cluwen | May 5, 1959 |
| 2,969,468 | Hogue | Jan. 24, 1961 |